United States Patent [19]

Port et al.

[11] 4,075,281

[45] * Feb. 21, 1978

[54] PURIFICATION OF CARBONATE PROCESS SOLUTIONS

[75] Inventors: Eugene Baker Port, Green River, Wyo.; Norman Rutledge Garofano, Syracuse, N.Y.

[73] Assignee: Allied Chemical Corporation, Morris Township, N.J.

[*] Notice: The portion of the term of this patent subsequent to Dec. 16, 1992, has been disclaimed.

[21] Appl. No.: 581,467

[22] Filed: May 28, 1975

Related U.S. Application Data

[63] Continuation-in-part of Ser. No. 146,443, May 24, 1971, Pat. No. 3,927,175, which is a continuation of Ser. No. 771,598, Oct. 29, 1968, abandoned.

[51] Int. Cl.$^2$ .................... C01D 7/26; B01D 15/06
[52] U.S. Cl. ........................ 423/206 T; 210/30 R; 210/32; 210/34; 210/80; 252/420; 423/421
[58] Field of Search .............. 423/206, 209, 419, 421, 423/427, 186; 210/30, 32, 34, 35, 80, 81, 411, 412, 82, 275, 277, 108; 252/420

[56] References Cited

U.S. PATENT DOCUMENTS

| 280,828 | 7/1883 | Howes | 210/412 |
|---|---|---|---|
| 2,136,660 | 11/1938 | Martin | 210/80 |
| 3,171,801 | 3/1965 | Rice et al. | 210/80 X |
| 3,528,766 | 9/1970 | Coglaitti et al. | 423/186 |
| 3,927,175 | 12/1975 | Garofano et al. | 423/421 |

*Primary Examiner*—Edward J. Meros
*Attorney, Agent, or Firm*—Gerard P. Rooney

[57] ABSTRACT

Present process relates to the purification of carbonate process solution which comprises passing said carbonate process solution through a bed of activated carbon to remove organic contaminants from said solution until the adsorbent capacity of said bed is reduced and regeneration of said bed is effected by passing an aqueous solution through said bed to remove the absorbed organics, said aqueous solution being maintained at elevated temperatures.

3 Claims, No Drawings

PURIFICATION OF CARBONATE PROCESS SOLUTIONS

RELATED APPLICATIONS

This application is a continuation-in-part of application Serial No. 146,443 filed May 24, 1971, now U.S. Pat. No. 3,927,175, issued Dec. 16, 1975, which in turn is a continuation application of application Ser. No. 771,598 filed Oct. 29, 1968, now abandoned.

BACKGROUND OF THE INVENTION

Trona as found in the Green River area of Wyoming consists mainly of sodium sesquicarbonate ($Na_2CO_3$·$NaHCO_3$·$2H_2O$). A typical analysis of trona contains:

| Constituent | Percent |
| --- | --- |
| $Na_2CO_3$ | 45 |
| $NaHCO_3$ | 36 |
| $H_2O$ | 15.30 |
| NaCl | 0.04 |
| $Na_2SO_4$ | 0.01 |
| $Fe_2O_3$ | 0.14 |
| Organic Matter | 0.30 |
| Insolubles | 3.20 |

In addition to a water insoluble fraction, which amounts to about 3%, resulting from the association of the trona with shale stringers or beds in the trona deposit, organic matter in the order of about 0.3% is present which would contaminate the desired product, e.g. sodium carbonate precursor crystals, unless it is removed. It is believed that the organic matter in the trona consists of kerogenaceous material containing monocarboxylic acids, dicarboxylic acids, certain unsaturated acids, steroids, and certain resin acids. The presence of these organics, as well as organic impurities picked up in the circulating liquors in the plant are present in the solution to be crystallized to obtain the desired sodium carbonate precursor crystals.

Various methods previously have been proposed to reduce the organics to an acceptable level so as not to adversely affect the crystal quality. For instance in U.S. Pat. Nos. 2,962,348 and 3,131,996 the crude trona is decarbonized at relatively high tempertures, i.e. in the order of about 400° C. to about 800° C. At these temperatures the organic matter present in the crude trona is substantially removed by oxidation and distillation. This method, of course, would involve a high heat requirement, thus increasing the cost of the ultimate product. Also, heating the trona in excess of 400° C., while eliminating a substantial amount of the carbon of the crude trona, substantially increases the quantity of water soluble silicate in the crude sodium carbonate, the removal of which is difficult, requiring the bleeding off of substantial amounts of the mother liquor separated from crystallizers. This results in a loss of valuable carbonate values in the discarded mother liquor.

Another method proposed for the reduction of organics is that described in U.S. Pat. No. 3,028,215, wherein the sodium carbonate precursor crystals containing organic impurities are subjected to a high temperature calcination, i.e. temperatures in the order of 400° C. to 800° C., wherein the organic impurities are either volatilized or converted to a coke which allegedly does not present any problem in the utilization of the resulting soda ash in commerce. However, the crystal quality of the precursor crystals is not significantly improved because the organics are present during the crystallization at which time their adverse effect is realized on the quality of the crystals produced during the crystallization. Also, the equipment and heating requirements to calcine the contaminated sodium carbonate precursor crystals are significant, particularly when production rates are of the magnitude of more than 1000 tons of product per day.

Still another method for reducing organics is that described in U.S. Pat. No. 3,260,567, wherein a crude trona is first converted to crude sodium carbonate at relatively low temperatures, i.e. in the order of 150° C. to 200° C., and then the crude sodium carbonate is dissolved in an aqueous solution. After removal of the insolubles by clarification, the organics are substantially reduced by passing a solution of crude sodium carbonate through a bed of an adsorbent, such as activated carbon, prior to crystallization. Obviously, after a number of filtrations through the carbon bed have taken place, the capability of the carbon to remove these organics from the carbonate process solution is substantially reduced. The prior practice, as disclosed in this patent, for the removal of these adsorbed organics from the activated carbon used in the purification of carbon process solutions has been achieved by reactivation of the carbonate by heating it in special ovens to temperatures in excess of about 500° C., preferably from about 700° C. to 900° C. The adsorbed organic contaminants are pyrolyzed to carbon or removed as products of combustion, thereby restoring the adsorption activity of the carbon to its original state. However, to subject the carbon to a heat treatment, the carbon first must be removed from the adsorption apparatus and after regeneration returned to the same. This requires a large amount of work and considerable loss of time. Also, there is a normal attrition loss of the carbon being reactivated, which is estimated to be on the order of about 5% to 10%. Furthermore, the ovens in which the carbon is to be regenerated are expensive. These drawbacks in the prior art method of regenerating carbon beds which remove organic contaminants from carbonate process solution add to the overall cost of the desired product.

Still another method is found in U.S. Pat. No. 3,528,766, which discloses the removal of soluble organic impurities from trona solutions using activated carbon and regeneration of the activated carbon with water which is maintained at a temperature substantially above the temperature of the solution from which the organics are removed.

It has now been found that the activated carbon which has become deactivated as a result of adsorbing organic contaminants from carbonate process solution may be regenerated by a relatively simple procedure which comprises passing a heated aqueous solution through the activated carbon bed, thereby desorbing essentially all of the organic contaminants adsorbed thereon. With the present wash method it is not necessary to remove the carbon from the adsorption towers. The washing can be accomplished in situ in the same column. By providing a group of columns arranged in parallel it is possible to operate continuously. Upon exhaustion of the adsorptive capacity of a given column or upon reduction of its adsorbent capacity to an uneconomical low level, e.g. absorption efficiencies reduced to about 75% or less, preferably to a level of about 50% or less, of the original adsorptive capacity of the adsorbent prior to the absorption cycle, the carbon tower can be taken off-stream and the deactivated carbon regenerated. Regeneration with the hot aqueous wash can be effected at temperatures from about 50° C. to about 95° C., preferably about 60° C. to 90° C., with temperatures in the range of about 70° C. to 85° C., being especially preferred.

The present invention is directed to the finding that regeneration of the exhausted activated carbon to a high level of adsorptive capacity can be achieved by passing the aqueous wash liquor through the bed being regenerated at a flow rate such that the activated carbon particles are periodically "reoriented" or "fluffed" at random intervals. That is, by adjusting the flow rate of the aqueous wash liquor through the bed of activated carbon the carbon particles become reoriented and portions of the activated carbon are exposed to aqueous wash liquor which may have adsorbed organics thereon and which are normally difficult to remove due to the degree of compaction and preferential channeling during the desorption cycle. The organics then can be more easily desorbed so that at least 60%, preferably at least 70% of the original activity of the adsorption capacity of the carbon is restored. By varying the flow rates of the aqueous wash liquor through the carbon bed at random intervals from flow rates insufficient to effect reorientation of the carbon bed to flow rates sufficient to achieve a state of "incipient fluidization" up to flow rates sufficient to effect an expansion of the carbon bed volume of about 75% of the static bed volume, it has been found that the carbon particles become reoriented, thereby permitting exposure of the carbon to the aqueous wash liquor which desorbs the organic contaminants from the carbon.

By the phrase "incipient fluidization" is meant the state of the carbon bed particles which become separated due to the flow rate of the wash liquor so that no stable arrangement of the particles exists and the particles vibrate or circulate locally in a semi-stable arrangement to a point wherein fluidization begins and particles reorientation occurs. Flow rates which achieve incipient fluidization up to about a bed expansion of about 50% of the static bed volume are especially preferred to minimize loss of the carbon carried over in the wash liquor. Superficial velocities of the wash liquor necessary to produce reorientation of the carbon bed particles will be dependent upon a number of variables, such as the size, distribution, density, true porosity and fractional voids of the carbon particles composing the bed; as well as the nature of the fluidizing media, its temperature, density, viscosity, pressure and other related parameters. The flow rate to achieve reorientation for a given bed of carbon can be best determined by test in equipment where visual observation of the bed can be made. For instance, superficial velocities of the wash liquor in the order of about 1 to about 40, preferably flow rates up to about 30 gallons per minute per square foot of cross section area of the carbon bed generally can be employed to achieve reorientation of the carbon bed particles. Depending upon the carbon bed particles employed, flow rates of the aqueous wash liquor insufficient to achieve substantially any reorientation may vary from about 0.25 to about 25, preferably from about 0.5 to about 12, gallons per minute per square foot of cross section area of the carbon bed.

By maintaining the flow rates of the wash liquor at a level which reorients or fluffs the carbon particles, regeneration efficiency can be maintained at a relatively high level in the order of about 80% or more desorption of the adsorbed organic impurities.

The adsorbed organic contaminants may be desorbed from the carbon by a procedure which utilizes previously employed wash liquors in a sequence of wash steps permitting an economical use of wash liquor. For instance, an aqueous wash liquor containing organic contaminants previously desorbed in a prior wash step may be used as the first wash liquor in a new cycle to desorb from the activated carbon the easily removable organic contaminants and thereafter subsequently employing a second aqueous wash liquor which has a substantially lower organic contaminant level than the first wash liquor. This second wash liquor may also previously have been employed in a prior wash cycle or it may be substantially free of organic contaminants, e.g. a fresh or relatively pure aqueous solution. As long as there is some capacity of the aqueous wash liquor to desorb the adsorbed organic contaminants from the activated carbon, such wash liquor may be employed in a wash cycle of the process of the present invention.

If this sequential wash procedure is used the first aqueous wash liquor employed is a relatively impure aqueous wash liquor which previously may have been used as the second wash liquor in desorbing organic contaminants from a deactivated carbon bed. The first wash liquor has an organic contaminant level lower than the carbonate process solution. The second aqueous wash liquor employed has a lower organic contaminant content than the first aqueous wash liquor in order to further desorb the organics from the carbon. This second aqueous wash liquor preferably is a third wash liquor previously employed in a prior wash cycle. After this second wash a third aqueous wash liquor substantially free of organic contaminants is employed. For instance, if a carbonate process solution contains an organic contaminant level in the order of about 370±30 parts per million, the organic contaminant level in the first aqueous wash liquor should contain a maximum of about 300 parts per million; in the second aqueous wash liquor a maximum level of about 150 parts per million; and in the third aqueous wash liquor a maximum level of about 25 parts per million. However, since the organic contaminant level of the carbonate process solution may vary, as indicated above, the maximum organic contaminant levels in each of the aqueous wash liquors may likewise vary.

With a three wash liquor wash cycle, desorption of organic contaminants from the activated carbon has been found to exceed 60% of the originally adsorbed, preferably desorption in the order of more than 70% is achieved. A plurality of such washing liquors may be employed to regenerate the activated carbon bed to a level which meets the needs of a particular plant capacity to cut down the number of off cycles for the carbon columns.

Suitable sources of the aqueous wash liquor include plant condensate and make-up water, such as from a local stream, spring or river which has been suitably treated to prevent the precipitation of insoluble matter upon contact with carbonate containing solutions. These may contain dissolved therein minor amounts of sodium carbonate precursor crystals, e.g. an aqueous solution containing about 1% sodium carbonate values. While other chemical components, e.g. alkali metal carbonates and hydroxides, may be employed in the aqueous wash liquors, it has been found that these components offer no significant improvement over the use of aqueous wash liquors maintained at elevated temperatures.

By the phrase "carbonate process solution" is meant a substantially saturated aqueous solution from which the sodium carbonate precursor crystals, i.e. sodium bicarbonate, sodium sesquicarbonate, anhydrous sodium carbonate and sodium carbonate monohydrate, may be formed as the stable crystal phase in a subsequent crystallization procedure. In addition to trona as the source of the carbonate process solution, other natural minerals may be used such as nahcolite ($NaHCO_3$), thermonatrite ($Na_2CO_3 \cdot H_2O$), natron ($Na_2CO_3 \cdot 10H_2O$) and dawsonite ($NaAlCO_3(OH)_2$), particularly when these minerals are associated with or near kerogen type deposits. The carbonate process solution may be prepared by a variety of different prior art methods described in U.S. Pat. Nos. 2,343,080; 2,343,081; 2,639,217; 2,704,239; 2,770,524; 2,962,348; 3,028,215; 3,131,996 and 3,260,567.

In order to better understand the practice of the present invention, the following examples are offered:

EXAMPLE I

In this example a laboratory size column 1 inch in diameter by 40 inches high, was charged with 122 grams of Pittsburgh Activated Carbon Company's granular, 12 × 40 mesh, carbon. The column of granular carbon was placed on a 5-inch column of 6 and 3-mm. glass beads for column drainage. The effective height of the granular carbon bed, excluding the glass beads, was about 24 inches. The volume of the carbon bed was approximately 300 mls. The glass tube containing the carbon bed was jacketed around the outside by a 2-inch diameter glass column containing hot water, 80° to 85° C., circulated by a pump.

Carbonate process solution comprising a substantially saturated sodium carbonate solution prepared from trona by the steps of crushing the trona, decarbonizing the trona to convert it to crude sodium carbonate, dissolving the crude sodium carbonate in an aqueous solution and clarifying the solution to remove the insolubles and containing approximately 340 parts per million organic carbon, basis sodium carbonate, was passed downward by gravity through the carbon bed maintained at a temperature of approximately 80° C. by the hot water jacket. The hot carbonate process solution was collected from the bottom of the column in 4-liter collection beakers. The carbonate process solution was passed through the carbon bed at a rate of approximately 3 gallons per minute per square foot of cross section area of the carbon bed. After approximately 267 bed volumes, which is equivalent to 80 liters of carbonate process solution being passed through the carbon bed, the flow of solution was stopped. A bed volume is a volume of liquor equal to an equivalent volume of carbon bed. The total organic carbon adsorbed in the column was approximately 4 grams, which amounted to an overall adsorption efficiency of 36.5%. The adsorption efficiency (the amount of organic impurity removed by the carbon relative to the total amount in the carbonate process solution treated) of the carbon column varied from an initial 48.5% for the first 53 bed volumes to a column adsorption efficiency for the last 64 bed volumes of 24.7% for an overall reduction in adsorption efficiency of the carbon bed of 50%.

The regeneration cycle was started after collecting the 80 liters of carbon treated carbonate process solution. Hot, deionized water maintained at a temperature between about 80° to 85° C. was admitted to the bottom of the carbon column after draining the carbonate process solution to within one inch of the top of the bed. The upward flow of the hot aqueous backwash liquor was regulated by a teflon needle valve stopcock attached to the bottom of the carbon column. The overhead discharge of aqueous backwash liquor was collected in increments of bed volumes, 300 mls each, in graduated cylinders. Several increments of backwash water were combined and filtered on a Buchner funnel to remove any fine carbon particles and the composite backwash sent for analytical determination. These data appear in Table I below.

TABLE I

| Carbon Bed Volume | 300 ml |
| Operating Temperature | 80° C. |
| Backwash Liquor | Deionized Water |
| Total Impurity Expected | 4.01 gm as Carbon |

| Cycle No. | Feed Wash Water | | | Impurity Level Found In Backwash | |
|---|---|---|---|---|---|
| | Liters | Bed Vols. | Backwash Flow Rate GPM/SF[1] | gm as Carbon | $R/R_o$[2] |
| I | 0 | 0 | — | (4.01) Expected | — |
| | 0.9 | 3 | 0.5 | 1.686 | 0.420 |
| | 1.8 | 6 | 0.5 | 1.253 | 0.312 |
| | 2.7 | 9 | 0.5 | 0.135 | 0.034 |
| | 3.6 | 12 | 0.5 | 0.045 | 0.011 |
| | 4.5 | 15 | 0.5 | 0.020 | 0.005 |
| | 4.8 | 16 | 3.5 | 0.005 | 0.001 |
| | 5.1 | 17 | 5.0 | 0.002 | 0.001 |

Total Impurity Recovered 3.146 gm = 3.15 gm
Total Elapsed Time = 7.6 hrs.

[1]Gallons per minute per square foot of cross section area of bed.
[2]$R/R_o$, Fractional amount of impurity relative to total expected.

The data of Table I indicate that 3.15 grams of carbonaceous impurity were recovered in the total aqueous backwash liquor. The amount of impurity expected was 4.01 grams, i.e. the amount originally adsorbed. The difference, 0.86 grams remained absorbed within the activated carbon particles. The amount of recovered impurity represents 78.4% of the expected amount. The total amount of backwash liquor was equivalent to 17 bed volumes, amounting to approximately 5.1 liters. The aqueous backwash liquor passed through the bed at a flow rate of approximately 0.5 gallons per minute per square foot of cross-sectional area of carbon bed, except for bed volumes 16 and 17 which had flow rates of 3.5 and 5.0 GPM/SF, respectively. The total elapsed time for the backwash step was 7.6 hours.

EXAMPLES II to X

In a similar manner as Example I, 9 additional cycles of the adsorption of organic carbon impurities from a carbonate process solution, prepared in a similar manner to the solution employed in Example I were conducted. Desorption was conducted in a manner similar to that used in Example I, except that some of the variables, i.e. temperature, flow rate, and the like, were modified. The data generated by these desorption cycles are reported in Table II.

TABLE II

| Cycle No. | Bed Volumes of Carbonate Process Solution Treated | Total Organic Impurity Adsorbed from Carbonate Process Solution (gms) | % Reduction in Adsorption Efficiency of Carbon Bed | Bed Volumes of Backwash Employed | Organic Impurity in Backwash Liquor Employed (gms) | Desorbed Organic Impurities In Backwash (gms) Per Bed Vol. | Desorbed Organic Impurities In Backwash (gms) Per Bed Total | Recovery of Adsorbed Organic Impurities wt. % |
|---|---|---|---|---|---|---|---|---|
| II | 267 | 4.14 | 35 | 0 | 0 | — | | 62.2 |
| | | | | 1.1 | | .109 | | |
| | | | | 2.3 | | .243 | | |
| | | | | 6.3 | | 2.081 | | |
| | | | | 10.3 | | .084 | | |
| | | | | 14.3 | | .037 | | |
| | | | | 16.3 | | .013 | | |
| | | | | 17.3 | | .005 | | |
| | | | | 18.3 | | .005 | | |
| | | | | | | | 2.58 | |
| III | 267 | 3.39 | 43 | 0 | 0 | — | | 90.9 |
| | | | | 4 | | 2.847 | | |
| | | | | 8 | | .126 | | |
| | | | | 12 | | .034 | | |
| | | | | 16 | | .024 | | |
| | | | | 20 | | .019 | | |
| | | | | 25 | | .018 | | |
| | | | | 27 | | .006 | | |
| | | | | 28 | | .003 | | |
| | | | | 29 | | .002 | | |
| | | | | 30 | | .001 | | |
| | | | | | | | 3.08 | |
| IV | 267 | 2.96 | 73 | 0 | 0 | — | | 96.3 |
| | | | | 6 | | 2.624 | | |
| | | | | 12 | | .113 | | |
| | | | | 18 | | .049 | | |
| | | | | 24 | | .031 | | |
| | | | | 30 | | .022 | | |
| | | | | 32 | | .008 | | |
| | | | | 36 | | .007 | | |
| | | | | | | | 2.85 | |
| V | 267 | 3.50 | 52 | 0 | 0 | — | | 129.2 |
| | | | | 4 | | 4.039 | | |
| | | | | 10 | | .315 | | |
| | | | | 16 | | .086 | | |
| | | | | 22 | | .038 | | |
| | | | | 28 | | .023 | | |
| | | | | 32 | | .008 | | |
| | | | | 34 | | .004 | | |
| | | | | 38 | | .006 | | |
| | | | | | | | 4.52 | |
| VI | 267 | 3.43 | 44 | 0 | 0 | — | | 129.5 |
| | | | | 4 | | 4.072 | | |
| | | | | 13 | | .265 | | |
| | | | | 21 | | .034 | | |
| | | | | 29 | | .034 | | |
| | | | | 36 | | .029 | | |
| | | | | 38 | | .005 | | |
| | | | | 42 | | .008 | | |
| | | | | | | | 4.44 | |
| VII | 267 | 2.70 | 38 | 0 | 0 | — | | 105.7 |
| | | | | 6 | | 2.398 | | |
| | | | | 12 | | .266 | | |
| | | | | 18 | | .076 | | |
| | | | | 24 | | .041 | | |
| | | | | 30 | | .029 | | |
| | | | | 36 | | .029 | | |
| | | | | 38 | | .008 | | |
| | | | | 40 | | .005 | | |
| | | | | | | | 2.85 | |
| VIII[3] | 267 | 2.40 | 34 | 0 | 0.26 | — | | 104.3 |
| | | | | 6 | | 2.311 | | |
| | | | | 12 | | .227 | | |
| | | | | 18 | | .094 | | |
| | | | | 24 | | .052 | | |
| | | | | 30 | | .041 | | |
| | | | | 36 | | .025 | | |
| | | | | 42 | | .014 | | |
| | | | | 48 | | .011 | | |
| | | | | 50 | | .004 | | |
| | | | | | | | 2.78 | |
| IX[3] | 253 | 3.10 | 49 | 0 | 0.20 | — | | 88.8 |
| | | | | 14 | | 2.506 | | |
| | | | | 22 | | .147 | | |
| | | | | 28 | | .120 | | |
| | | | | 36 | | .065 | | |
| | | | | 44 | | .060 | | |
| | | | | 48 | | .024 | | |
| | | | | 50 | | .006 | | |
| | | | | | | | .003 | |
| | | | | | | | 2.93 | |
| X[3][4] | 267 | 2.14 | 61 | 0 | 0.31 | — | | 108.7 |

TABLE II-continued

| Cycle No. | Bed Volumes of Carbonate Process Solution Treated | Total Organic Impurity Adsorbed from Carbonate Process Solution (gms) | % Reduction in Adsorption Efficiency of Carbon Bed | Bed Volumes of Backwash Employed | Organic Impurity in Backwash Liquor Employed (gms) | Desorbed Organic Impurities In Backwash (gms) Per Bed Vol. | Total | Recovery of Adsorbed Organic Impurities wt. % |
|---|---|---|---|---|---|---|---|---|
|  |  |  |  | 8 |  | 2.246 |  |  |
|  |  |  |  | 14 |  | .148 |  |  |
|  |  |  |  | 22 |  | .086 |  |  |
|  |  |  |  | 30 |  | .096 |  |  |
|  |  |  |  | 38 |  | .036 |  |  |
|  |  |  |  | 46 |  | .036 |  |  |
|  |  |  |  | 48 |  | .011 |  |  |
|  |  |  |  | 50 |  | .006 |  |  |
|  |  |  |  |  |  |  | 2.67 |  |

(3)Backwash liquor partially made up of previously employed wash liquors.
(4)Adsorption at 60° C., desorption at 80° C.

In Cycles VIII, IX and X a portion of the water employed for backwashing about 30 bed volumes, was from the preceding aqueous backwash liquor cycle, thus demonstrating significant backwash economy by employing partially used water to carry away the bulk of the easily desorbed impurities. The total impurity recovered from the 10 cycle backwash, i.e. 31.85 grams, contained 0.77 gram of impurity introduced by reuse of the aqueous backwash liquor. The actual recovery was therefore 31.08 grams which is a 97.8% recovery, or accountability of carbonaceous impurity originally adsorbed on the carbon throughout the total 10 cycles.

It should be noted that for Cycles V through VIII and X more organic contaminant was desorbed than was originally adsorbed in each of these cycles because the degree of desorption in the cumulative preceding cycles was less than 100%. Also, backwash flow rates for Cycles V through X employed, more frequently, the use of fluffing sequences so that the particles of granular carbon were reoriented more often than in the preceding cycles, thereby permitting more efficient internal flushing of the granular carbon resulting in a significant reduction in regeneration time (Cycles IX and X). These data appear in Table III, below.

TABLE III

Flow Rate: Gallons per minute per square foot of cross section area of bed (GPM/SF)
Backwash Cycle Number

| Bed Vol. No. | II | III | IV | V | VI | VII | VIII | IX | X |
|---|---|---|---|---|---|---|---|---|---|
| 1 | .5 | 3 | 3 | 3 | 3 | 6 | 6 | 6 | 6 |
| 2 | 1 | .5 | .5 | 3 | 3 | 6 | 6 | 6 | 6 |
| 3 | .5 | 3 | 3 | .5 | .5 | .5 | .5 | 3 | 3 |
| 4 | .5 | .5 | 3 | .5 | .5 | .5 | .5 | 3 | 3 |
| 5 | .5 | 3 | .5 | 3 | 6 | 6 | 6 | 6 | 6 |
| 6 | .5 | .5 | 3 | 3 | 6 | 6 | 6 | 6 | 6 |
| 7 | .5 | 3 | .5 | .5 | .5 | .5 | .5 | 3 | 3 |
| 8 | .5 | .5 | 3 | .5 | .5 | .5 | .5 | 3 | 3 |
| 9 | .5 | 3 | .5 | 3 | 3 | 3 | 3 | 6 | 6 |
| 10 | .5 | .5 | 3 | .5 | .5 | .5 | .5 | 3 | 6 |
| 11 | .5 | 3 | .5 | .5 | .5 | .5 | .5 | 3 | 3 |
| 12 | .5 | .5 | 3 | 3 | 3 | 3 | 3 (a) | 6 | 6 |
| 13 | .5 | 3 | .5 | .5 | .5 | .5 | .5 | 3 | 3 |
| 14 | .5 | .5 | 3 | .5 | .5 | .5 | .5 | 3 (a) | 3 (a) |
| 15 | .5 | 3 | .5 | 3 | 3 | 3 | 3 | 6 | 6 |
| 16 | .5 | .5 | 3 | .5 | .5 | .5 | .5 | 3 | 3 |
| 17 | .5 | 3 | .5 | .5 | .5 | .5 | .5 | 3 | 3 |
| 18 | .5 | .5 | 3 | 3 | 3 | 3 | 3 | 6 | 6 |
| 19 |  | 3 | .5 | .5 | .5 | .5 | .5 | 3 | 3 |
| 20 |  | .5 | 3 | .5 | .5 | .5 | .5 | 3 | 3 |
| 21 |  | 3 | .5 | 3 | 3 | 3 | 3 | 3 | 3 |
| 22 |  | .5 | 3 | .5 | .5 | .5 | .5 | .5 | .5 |
| 23 |  | 3 | .5 | .5 | .5 | .5 | .5 | .5 | .5 |
| 24 |  | .5 | 3 | 3 | 3 | 3 | 3 | 3 | 3 |
| 25 |  | 3 | .5 | .5 | .5 | .5 | .5 (b) | 6 | 6 |
| 26 |  | 6 | 3 | .5 | .5 | .5 | .5 | 6 | 6 |
| 27 |  | 5 | .5 | 3 | 3 | 3 | 3 | 3 | 3 |
| 28 |  | .5 | 3 | .5 | .5 | .5 | .5 | .5 | .5 (b) |
| 29 |  | 5 | 3 | .5 | .5 | .5 | .5 | .5 | .5 |
| 30 |  | 6 | .5 | 3 | 3 | 3 | 3 (b) | 3 | 3 |
| 31 |  |  | 3 | .5 | .5 | .5 | .5 | 6 | 6 |
| 32 |  |  | 3 | .5 | .5 | .5 | .5 | 6 | 6 |
| 33 |  |  | .5 | 3 | 3 | 3 | 3 | 3 | 3 |
| 34 |  |  | .5 | .5 | .5 | .5 | .5 | .5 | .5 |
| 35 |  |  | 3 | .5 | .5 | .5 | .5 | .5 | .5 |
| 36 |  |  | 3 | 3 | 3 | 3 | 3 | 3 | 3 |
| 37 |  |  |  | .5 | .5 | .5 | .5 | 6 | 6 |
| 38 |  |  |  | .5 | .5 | .5 | .5 | 6 | 6 |
| 39 |  |  |  | 3 | 3 | 3 | 3 | 3 | 3 |
| 40 |  |  |  |  | .5 | .5 | .5 | .5 | .5 |
| 41 |  |  |  |  | .5 |  | .5 | .5 | .5 |
| 42 |  |  |  |  | 3 |  | 3 | 3 | 3 |
| 43 |  |  |  |  |  |  | .5 | 6 | 6 |
| 44 |  |  |  |  |  |  | .5 | 6 | 6 |
| 45 |  |  |  |  |  |  | 3 | 3 | 3 |

TABLE III-continued

Flow Rate: Gallons per minute per square foot of cross section area of bed (GPM/SF)
Backwash Cycle Number

| Bed Vol. No. | II | III | IV | V | VI | VII | VIII | IX | X |
|---|---|---|---|---|---|---|---|---|---|
| 46 | | | | | | | .5 | .5 | .5 |
| 47 | | | | | | | .5 | .5 | .5 |
| 48 | | | | | | | 3 | 3 | 3 |
| 49 | | | | | | | .5 | 3 | 3 |
| 50 | | | | | | | .5 | 3 | 3 |
| Time | 525m 8.7h | 436m 7.3h | 580m 9.6h | 735m 12.25h | 855m 14.25h | 815m 13.6h | 1040m 17.3h | 460m 7.7h | 460m 7.7h |

(a) Composited middle fraction of preceding backwash cycle.
(b) Composited end fraction of preceding backwash cycle.

From these data it may be seen that the most effective backwash technique is one in which the carbon bed is periodically reoriented or fluffed. For 12 × 14 mesh carbon this was accomplished by the more frequent use of flow rates of about 6 GPM/SF (Cycles VIII, IX and X) which produced reorientation of the carbon bed and expanded the bed to about 40% to 45% of its static bed volume with an aqueous wash at 80° C. for the 1-inch by 24-inch carbon bed. After reorientation, flow rates of about 3 GPM/SF easily displace desorbed impurities. Flow rates of about 0.5 GPM/SF are particularly effective when the aqueous wash liquor is substantially free of organic contaminants.

EXAMPLE XI

Portions of the effluent carbonate process solutions from four of the ten cycles of Examples I to X were subjected to crystallization under conditions to form sodium carbonate monohydrate as the stable crystal phase, i.e. temperatures of about 60° C. and a pressure of 25 inches of mercury vacuum. Crystallization was carried out until a sufficient amount of water was removed to prepare a slurry containing approximately 40 to 45% solids. The monohydrate crystals were separated from mother liquor and dried. Summarized results of these tests are shown in Table IV.

bulk density of 900 to 950 grams per liter. The same carbonate process solution, when subjected to carbon tower treatment gave white monohydrate crystals of pour bulk density in the range of 1000 to 1150 grams per liter (Tests 2 to 5). From these data it may also be seen that monohydrate crystals produced from carbonate process solution liquors passed through the carbon near the end of the adsorption cycle are slightly less dense than those produced near the beginning of an adsorption cycle. Densities of 1050 to 1100 grams per liter were obtained from liquors generated at the end of Cycle V (Test No. 2), whereas higher densities, i.e. 1100 to 1150 grams per liter, were obtained with carbonate process solution generated in the first portion of Cycle VI (Test No. 3). Acceptable crystal densities were obtained over the entire 10-cycle study even employing the carbon beds regenerated with the use of previously employed aqueous backwash liquor, i.e. adsorption Cycles IX and X. The effluent carbonate process solution from these cycles, Tests No. 4 and 5 gave monohydrate crystals of acceptable bulk density, i.e. 1000 to 1050 grams per liter.

EXAMPLE XII

A series of runs were conducted in equipment similar to that employed in Example I employing various com-

TABLE IV

| Crystal-lization Test No. | Description of Carbonate Process Solution Source | Impurity Level (ppm as Organic Carbon, basis Na$_2$CO$_3$) | | | Monohydrate Loose Pour Bulk Density (Gm. Per Liter) |
|---|---|---|---|---|---|
| | | Feed Liquor | Monohydrate Crystal | Mother Liquor | |
| 1 | Untreated liquor | 370 | 50 | 775 | 900 to 950* |
| 2 | Last 1/4, Cycle V | 430 | 80 | 750 | 1050 to 1100 |
| 3 | First 1/4, Cycle VI | 300 | 62 | 570 | 1100 to 1150 |
| 4 | Composite, Cycle IX | 260 | 40 | 525 | 1000 to 1050 |
| 5 | First 1/4, Cycle X | 290 | 51 | 430 | 1000 to 1050 |

*Brownish colored crystals

From the data of Table IV it may be seen that the carbonate process solution not treated (Test 1) by passage through a carbon column produced inferior brownish colored monohydrate crystals having a pour mercially available activated carbon. The physical characteristics of the carbon employed are tabulated in Table V, below.

TABLE V

| Commercial Activated Carbons: Mesh | A[1] 8 × 30 | B[2] 8 × 30 | C[3] 12 × 40 | D[4] 12 × 40 | E[5] 12 × 30 |
|---|---|---|---|---|---|
| Apparent Bulk Density (g/cc) | 0.48 | 0.48 | 0.44 | 0.44 | — |
| Particle Density [Hg] (g/cc) | 0.75 | 0.72 | 0.67 | 0.7 | — |
| Pore Volume [Particle] (cc/g) | 0.85 | 0.88 | 0.98 | 0.94 | — |
| Voids in Packed Column (%) | 36 | 40 | 40 | 38 | — |
| Mean Particle Diameter (mm) | 1.50–1.70 | — | 1.0 (calc) | 0.90–1.10 | 1.125 (calc) |
| Wet Particle Density (g/cc) | — | 1.4 | 1.4 | 1.38 (calc) | — |

TABLE V-continued

| Screen | Screen Size Distribution (Fractional Amount Retained On Screen) | | | | | |
|---|---|---|---|---|---|---|
| | Average Dia. (mm) | | | | | |
| 0/+8 | — | .064 | — | .002 | .000 | .000 |
| −8/+10 | 2.015 | .277 | — | .009 | .000 | .000 |
| −10/+14 | 1.530 | .331 | — | .061 | .075 | .106 |
| −14/+20 | 1.125 | .251 | — | .685 | .681 | .818 |
| −20/+28 | 0.715 | .066 | — | .184 | .160 | .072 |
| −28/+40 | 0.540 | .011 | — | .048 | .072 | .004 |
| −40/+150 | 0.297 | .000 | — | .011 | .012 | .000 |
| −150 | 0.052 | .000 | — | .000 | .000 | .000 |

[1] Pittsburgh Activated Carbon Company's SGL
[2] Westvaco's WV-L
[3] Westvaco's WV-G
[4] Pittsburgh Activated Carbon Company's CAL
[5] Witco's 505

In each of the runs the flow rates of an aqueous wash liquor were varied through the carbon beds. Pertinent data on these runs are presented in Table VI, below.

TABLE VI

| Commercial Activated Carbon | Mean Particle Diameter (mm) | Carbon Column | | | Weight Dry Carbon (gm) | Backwash Flow Rates (GPM/SF)[1] of 25° C. Water For Expansion of Static Bed Volume to: | | | | | | | Bed Expansion & Flow Rates at Incipient Fluidization | |
|---|---|---|---|---|---|---|---|---|---|---|---|---|---|---|
| | | Diameter (cm) | Height | | | 10% | 20% | 30% | 40% | 50% | 75% | 100% | %BV Exp. | GPM/SF |
| | | | Initial (cm) | Final (cm) | | | | | | | | | | |
| B | ca 1.5 | 2.45 | 27.0 | /27.0 | 50 | 14 | 18 | 21 | 26 | 29 | 37 | 42 | 40% | 26 |
| A | 1.54 | 2.45 | 23.0 | /24.3 | 50 | 13 | 17 | 21 | 24 | 27 | 33 | 39 | 40% | 24 |
| E | 1.125 | 2.45 | 23.0 | /23.0 | 50 | 6 | 8 | 10 | 13 | 14 | 20 | 24 | 50 – 60% | 14–18 |
| C | ca 1.0 | 2.45 | 27.5 | /27.5 | 50 | 6 | 8 | 10 | 12 | 13 | 18 | 21 | 40 – 50% | 12–13 |
| D | 1.05 | 2.45 | 23.7 | /27.5 | 50 | 3 | 5 | 7 | 9 | 10 | 14 | 17 | 50% | 10 |
| D | 1.05 | 2.45 | 39.2 | /41.0 | 75 | 4 | 6 | 8 | 9 | 11 | 14 | — | ca 50% | 11 |
| D | 1.05 | 5.20 | 29.9 | /30.9 | 250 | 5 | 6 | 9 | 10 | 12 | 15 | 19 | 50 – 75% | 12–15 |

[1] Gallons per minute per square foot of cross section area of the carbon bed.

From these data it can readily be seen that reorientation of the carbon bed particles will be dependent upon a number of variables including the size, distribution, density, true porosity and fractional voids of the carbon particles composing the bed.

We claim:

1. A process for the reduction of soluble organic contaminants in a carbonate process solution which comprises passing said process solution through a bed of activated carbon particles until the adsorption efficiencies of said bed for the removal of said organic contaminants is reduced to at least 75% of the original adsorptive capacity of the activated carbon bed prior to regeneration, regenerating said bed by subjecting said bed to an aqueous wash cycle which comprises passing an aqueous wash liquor through said bed until at least 60% of said adsorbed organic contaminants have been desorbed, wherein the flow rates of the aqueous wash liquor are periodically randomly varied from flow rates insufficient to effect reorientation of the carbon bed particles to flow rates sufficient to effect volume bed expansion up to about 75% of the static bed volume and said aqueous wash liquor has an organic contaminant level lower than the carbonate process solution and said aqueous wash liquor is maintained at a temperature between 50° and 95° C.

2. The process of claim 1 wherein said aqueous wash liquor has flow rates from about 1 to about 40 gallons per minute per square foot of cross section area of the carbon bed.

3. The process of claim 1 wherein the flow rates of the wash liquor are sufficient to effect reorientation of the carbon bed particles from incipient fluidization up to a volume bed expansion of about 50% of the static bed volume.

* * * * *